United States Patent Office 3,049,565
Patented Aug. 14, 1962

---

3,049,565
PRODUCTION OF UNSATURATED KETONES
Richard Norman Lacey, Hull, and Peter Nayler, Willerby, England, assignors to The Distillers Company Limited, Edinburgh, Scotland, a British company
No Drawing. Filed Dec. 17, 1959, Ser. No. 860,083
Claims priority, application Great Britain Feb. 20, 1959
1 Claim. (Cl. 260—595)

The present invention relates to the production of organic compounds and in particular to the production of unsaturated ketones.

The present invention is a process of producing an unsaturated ketone representable by the formula

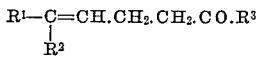

which comprises contacting an allyl acetoacetate representable by the formula

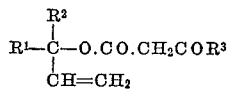

with an aluminum tri-phenoxide, wherein $R^1$ and $R^2$ are lower alkyl groups or hydrogen atoms and $R^3$ is a lower alkyl group.

The aluminum tri-phenoxide may be, for example, aluminum tri-(methyl salicylate).

The allyl acetoacetate may be contacted with the aluminum tri-phenoxide with advantage at an elevated temperature, preferably at a temperature in the range from 100° to 300° C. The temperature used in any particular embodiment of the invention depends on the nature of the allyl acetoacetate heated; if, for instance, the allyl acetoacetate is methylbutenyl acetoacetate, it may be heated at a temperature from 110° to 170° C., preferably from 140° to 270° C. The allyl acetoacetate is conveniently heated with the aluminum triphenoxide in an apparatus which enables a steady stream of carbon dioxide to be evolved and removed.

The following example further illustrates the invention.

*Example*

500 grams of methylbutenyl acetoacetate were heated with 17.6 grams of aluminum tri-(methyl salicylate) in a reactor fitted with a stirrer and a gas outlet, at 140° to 170° C., so that a steady stream of carbon dioxide was evolved from the pyrolysis of the methylbutenyl acetoacetate, leaving methylheptenone in the reactor. The catalyst concentration was 13 millimoles of aluminum tri-(methyl salicylate) per mole of methylbutenyl acetoacetate. The yield of methylheptenone based on the methylbutenyl acetoacetate was 72%.

As a comparison with this example of the invention, the procedure was repeated with 500 grams more of the same sample of methylbutenyl acetoacetate, except that no catalyst was present. The yield of methylheptenone obtained was only 63.5%, based on the methylbutenyl acetoacetate.

We claim:

A process of producing an unsaturated ketone having the formula

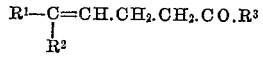

which comprises contacting at a temperature in the range of 100° to 300° C. an allyl acetoacetate representable by the formula

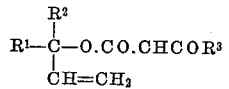

with aluminum tri-(methyl salicylate), wherein $R^1$ and $R^2$ are selected from the group consisting of lower alkyl groups and hydrogen atoms and $R^3$ is a lower alkyl group.

References Cited in the file of this patent

UNITED STATES PATENTS

| | | |
|---|---|---|
| 2,795,617 | Kimel et al. | June 11, 1957 |
| 2,839,579 | Kimel et al. | June 17, 1958 |